United States Patent [19]
Haugwitz et al.

[11] 3,926,967
[45] Dec. 16, 1975

[54] 2-(HETEROCYCLICME-THYLIDENEAMINO)BENZIMIDAZOLES AND DERIVATIVES THEREOF

[75] Inventors: Rudiger D. Haugwitz, Titusville; Venkatachala L. Narayanan, Hightstown, both of N.J.

[73] Assignee: E. R. Squibb & Sons, Inc., Princeton, N.J.

[22] Filed: Oct. 7, 1974

[21] Appl. No.: 512,385

Related U.S. Application Data

[63] Continuation-in-part of Ser. No. 303,887, Nov. 6, 1972, abandoned.

[52] U.S. Cl....... 260/240 A; 260/240 G; 260/240.1; 424/245; 424/269; 424/270; 424/275
[51] Int. Cl.².............. C07D 405/12; C07D 405/14; C07D 409/12
[58] Field of Search.......... 260/240 G, 240 A, 240.1

[56] References Cited
UNITED STATES PATENTS
3,839,347  10/1974  Fisher et al. .................... 260/240 G

OTHER PUBLICATIONS

Garnovskll Zh. Obsh. Khim. 38 (8) 1968 pp. 1858–1864.

Hankovszky et al. Acta Chim. Acad. Scient. Hung. Tomus 53(1967) p. 405–416.

*Primary Examiner*—Arthur F. Demers
*Attorney, Agent, or Firm*—Lawrence S. Levinson; Merle J. Smith; Stephen B. Davis

[57]     ABSTRACT 2-(Heterocyclicmethylideneamino)benzimidazoles and derivatives thereof and their methods of preparation are disclosed. In addition, pharmaceutical compositions containing said benzimidazoles and methods for using said compounds in the treatment of inflammation are taught.

10 Claims, No Drawings

2-(HETEROCYCLICMETHYLIDENEAMINO)BENZIMIDAZOLES AND DERIVATIVES THEREOF

This application is a continuation-in-part of Ser. No. 303,887 filed on Nov. 6, 1972, now abandoned.

In seeking new drugs for the treatment of inflammation, medicinal researchers have only had a limited degree of success. The most potent present day anti-inflammatory agents are of a steroidal nature and exhibit numerous undesirable side reactions. In addition, the non-steroidal agents are generally either of a high order of toxicity, such as in the case of phenylbutazone or a low order of activity as in the case of aspirin. Thus the search for new synthetic anti-inflammatory agents is a continuing one.

This invention relates to anti-inflammatory compounds of the formula

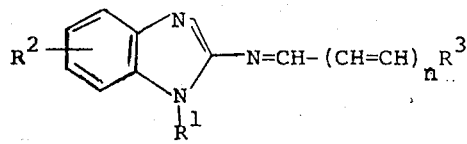

wherein $R^1$ is hydrogen, lower alkyl, benzyl, thiazoline, substituted thiazoline wherein said substituent is selected from the group consisting of lower alkyl, phenyl and benzyl, 5,6-dihydro-4H-1,3-thiazine and substituted thiazine wherein said susbstituent is selected from the group consisting of lower alkyl, phenyl and benzyl; $R^2$ is hydrogen, lower alkyl, aryl, lower alkylaryl, aryllower alkyl, lower alkoxy, nitro, halo or acyl; $R^3$ is a heterocyclic ring; n is zero or one; and pharmaceutically acceptable salts thereof.

The preferred compounds of the instant invention are those wherein $R^3$ is thienyl or furyl, n is zero, $R^1$ is thiazoline or 5,6-dihydro-4H-1,3-thiazine, and $R^2$ is hydrogen, nitro or chloro, and the pharmaceutically acceptable salts thereof.

Also preferred are the compounds wherein $R^3$ is thienyl, n is zero, $R^1$ is hydrogen and $R^2$ is hydrogen, nitro or chloro and the compounds wherein $R^3$ is furyl, n is zero, $R^1$ is hydrogen and $R^2$ is nitro or chloro, and the pharmaceutically acceptable salts thereof.

In addition, this invention relates to processes for preparing the compounds of this invention, pharmaceutical compositions containing the compounds of this invention and methods for using said compositions in the treatment of inflammation.

The term "aryl" is intended to include phenyl, naphthyl, substituted phenyl wherein said substituent may be fluoro, chloro, bromo, iodo, nitro, trifluoromethyl, lower alkyl and lower alkoxy.

The term "lower alkyl" is intended to mean a straight or branched hydrocarbon fragment of from one to eight carbon atoms.

The term "lower alkoxy" is intended to mean a lower alkyl group linked through a single bond to oxygen.

The term "acyl" is intended to include aryl

and lower alkyl

The term "heterocyclic ring" is intended to encompass the following heterocyclic systems: furans, thiophenes, pyrroles, benzofurans, benzothiaphenes, indoles, oxazoles, isoxazoles, thiazoles, thiadiazoles, oxadiazoles, triazoles, imidazoles, benzimidazoles, benzothiazoles, benzoxazoles, pyrimidines, pyridines, pyrazines, etc. The heterocycle may be linked to the methylideneamino group by way of any available position, such as pyrrol-2-yl-CH=N-, indol-7-yl CH=N-, and benzimidazol-5-yl-CH=N- and said ring system may be unsubstituted or bear a lower alkyl group.

The term "pharmaceutically acceptable salts" is intended to mean acid addition salts of a relatively low order of toxicity, such as the hydrochloride, sulfate, phosphate, acetate, citrate, tartrate, etc.

The compounds of this invention are prepared from compounds of the formula:

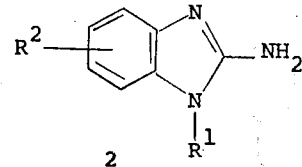

wherein $R^1$ and $R^2$ are as previously defined. Compounds wherein $R^1$ is hydrogen, lower alkyl and benzyl are prepared by numerous literature procedures (Weissberger, The Chemistry of Heterocyclic Compounds, Imidazole and its Derivatives, Interscience Publishers, Co., New York, 1953). A general procedure for their preparation involves the conversion of a compound of structure 2a into a salt of structure 3 by

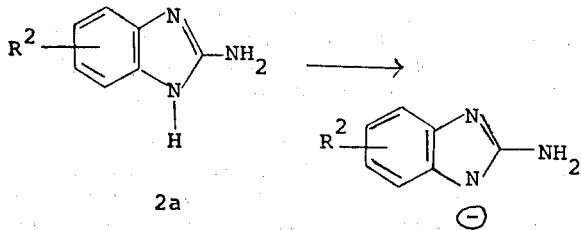

utilizing a strong base, such as sodamide or potassium amide in liquid ammonia, sodium hydrides in an aromatic hydrocarbon (benzene, toluene, etc.), sodium alkoxide or potassium alkoxide in an alcohol, sodium, potassium, lithium in an aromatic solvent, organolithium or Griguard Reagents in an ether, such as tetrahydrofuran, ethyl ether, glyme, etc. The reaction is carried out at a temperature range of from about 0° to about 150°, preferably room temperature to 80° for from about one hour to about 24 hours.

The salt 3 in turn is reacted with the desired lower alkyl iodide or sulfonate or benzyl chloride to give compounds of the structure 2.

This procedure may also be employed to introduce the thiazolinyl and thiazinyl groups at the one position by substituting a haloalkyl isothiocyanate in place of the alkyl or benzyl halide. This procedure is the subject of United States application Ser. No. 230,122, now U.S. Pat. No. 3,825,537 filed Feb. 28, 1972 which is incorporated by reference.

A second method for the preparation of compounds of the formula 2 wherein $R^1$ is thiazolinyl and thiazinyl utilizes a cyanogen halide and an o-(thiazolinyl or thiazinyl)aminoaniline(4) which is the subject of U.S. application 230,121, now U.S. Pat. No. 3,816,444 filed Feb. 28, 1972 and is also incorporated by reference. This reaction is exemplified by the following:

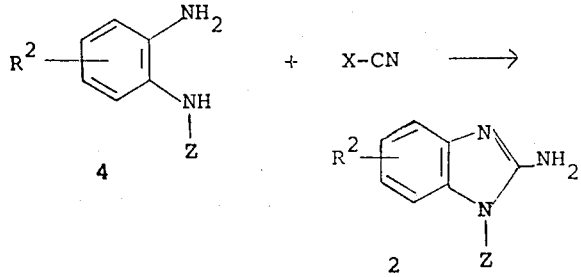

wherein Z is thiazolinyl, substituted thiazolinyl, thiazinyl and substituted thiazinyl and X is chloro or bromo.

The compounds of formula 2 are converted into the compounds of this invention by reaction with a heterocyclic aldehyde.

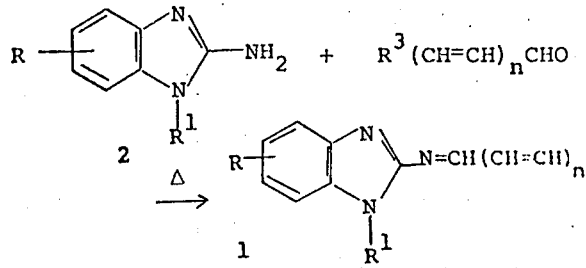

This condensation may be carried out in protic solvents, such as ethanol, propanol, iso-amyl alcohol, etc., aprotic solvents, such as nitrobenzene, dimethyl sulfoxide, dimethyl formamide, etc. or the aldehyde when employed in excess may serve as reactant and solvent. The reactions are carried out at a temperature range of from about 80° to about 200°, preferably of from about 120 to 180 for a period of from about 5 minutes to about 24 hours, preferably about 3–5 hours to about 30.

The compounds of this invention and their relatively non-toxic pharmaceutically acceptable acid addition salts have thus been found to be useful in the treatment of inflammation in mammals, such as dogs, cattle, sheep, etc. when administered in amounts ranging from about one mg. to about 15 mg. per kg. of body weight per day. A preferred dosage regimen for optimum results would be from about two mg. to about 10 mg. per kg. of body weight per day, and such dosage units are employed that a total of from about 0.5 g. to 1.0 g. of active ingredient for a subject of about 70 kg. body weight are administered in a 24 hour period. The compounds of the present invention may be administered by any convenient route such as orally, intraperitoneally, subcutaneously, intramuscularly or intravenously.

In addition, the compounds of this invention may be used as topical anti-inflammatory agents in the form of ointments, creams, aerosols and lotions wherein said active ingredient is present in the range of from about 0.1 to about 1.0 percent.

Compositions according to the present invention having the desired clarity, stability, and adaptability for parental use are obtained by dissolving from 0.10 to 10.0 percent by weight of active compound in a vehicle consisting of a polyhydric aliphatic alcohol or mixtures thereof. Especially satisfactory are glycerin, propylene glycol, and the polyethylene glycols. The polyethylene glycols consist of a mixture of non-volatile, normally liquid, polyethylene glycols which are soluble in both water and organic liquids and which have molecular weights of from about 200 to about 1500. Although the amount of active compound dissolved in the above vehicle may vary from 0.10 to 10.0 percent by weight, it is preferred that the amount of active compound employed be from about 3.0 percent to about 9.0 percent by weight. Although various mixtures of the aforementioned non-volatile polyethylene glycols may be employed, it is preferred to use a mixture having an average molecular weight of from about 200 to about 400.

In addition to the active compounds, the parenteral solutions of the present invention may also contain various preservatives which may be used to prevent bacterial and fungal contamination. The preservatives which may be used for such purpose are, for example, benzyl alcohol, myristyl-gammapicolinium chloride, phenyl mercuric nitrate, benzalkonium chloride, phenethyl alcohol, p-chlorophenyl-α-glycerol ether, methyl and propyl parabens, and thimerosal. As a practical matter it is also convenient to employ antioxidants. Suitable antioxidants include, for example, sodium bisulfite, sodium metabisulfite, and sodium formaldehyde sulfoxylate. Generally, from about 0.05 percent to about 0.2 percent concentrations of antioxidant are employed.

The preferred concentration of active compound is 25 to 50 mg./ml. of the finished compositions when intramuscular injection is the purpose for which the compositions are intended. They are equally adapted to intravenous administration when diluted with water or diluents employed in intravenous therapy such as isotonic glucose in appropriate quantities. For this use, initial concentrations down to about 10 to 25 mg./ml. of active compound are satisfactory. They are also adapted to oral administration when diluted with drinking water.

The active compounds of the present invention may be orally administered, for example, with an inert diluent or with an assimilable edible carrier, or they may be enclosed in hard or soft gelatin capsules, or they may be compressed into tablets, or they may be incorporated directly with the food of the diet. For oral therapeutic administration, the active compounds of this invention may be incorporated with excipients and used in the form of tablets, troches, capsules, elixirs, suspensions, syrups, wafers, chewing gum, and the like. Such compositions and preparations should contain at least 0.1 percent of active compound. The percentage in the compositions and preparations may, of course, be varied and may conveniently be between about 5 to about 75 percent or more of the weight of the unit. The amount of active compound in such therapeutically useful compositions or preparations is such that a suitable dosage will be obtained. Preferred compositions or preparations according to the present invention are prepared so that an oral dosage unit form contains between about 10 and 500 milligrams of active compound.

The tablets, troches, pills, capsules and the like may also contain the following: a binder such as gum tragacanth, acacia, corn starch or gelatin; an excipient such as dicalcium phosphate; a disintegrating agent such as corn starch, potato starch, alginic acid and the like; a lubricant such as magnesium stearate; and a sweetening agent such as sucrose, lactose or saccharin may be added or a flavoring agent such as peppermint, oil of wintergreen, or cherry flavoring. When the dosage unit form is a capsule, it may contain in addition to materials of the above type a liquid carrier such as a fatty oil. Various other materials may be present as coatings or to otherwise modify the physical form of the dosage unit, for instance, tablets, pills or capsules may be coated with shellac, sugar, or both. A syrup or elixir may contain the active compounds, sucrose as a sweetening agent, methyl and propyl parabens as preservatives, a dye and a flavoring such as cherry or orange flavor. Of course, any material used in preparing any dosage unit form should be pharmaceutically pure and substantially non-toxic in the amounts employed.

DETAILED DESCRIPTION

The following examples are provided for illustrative purposes and may include particular features of the invention; however, the examples should not be construed as limiting the invention, many variations of which are possible without departing from the spirit or scope thereof.

EXAMPLE 1

2-Amino-1-(2-thiazolinyl-2-yl)benzimidazole

To a solution of 6.65 g. of 2-aminobenzimidazole in 150 ml. of dry glyme there is added 2.5 g. of sodium hydride. After the vigorous gas evolution has ceased the mixture is treated with 12.2 g. of 2-chloroethyl isothiocyanate and refluxed for thirty minutes. The solvent is evaporated and cautiously there is added ice. The resulting oily solid is filtered off and washed with little ice-cold acetone. The resulting solid is crystallized from acetone to yield 5.5 g., m.p. 187°–190°.

EXAMPLE 2

2-Amino-1-(5,6-dihydro-4H-1,3-thiazin-2-yl)-benzimidazole

To a solution of 14.6 g. of 2-aminobenzimidazole in 350 ml. of dry glyme there is added 3.3 g. of sodium hydride and the mixture is stirred at room temperature for one hour. A solution of 19.8 of 3-bromopropyl isothiocyanate in 10 ml. dry glyme is then added and the mixture is refluxed for one hour. The solvent is evaporated and water is added to the residue. The resulting solid is filtered off and crystallized from glyme to yield 11.0 g. of product, m.p. 174°–176.5°.

EXAMPLE 3

2-Amino-5,6-dichloro-1-(2-thiazolin-2-yl)-benzimidazole

To a solution of 6.1 g. of 2-amino-5,6-dichlorobenzimidazole in 100 ml. glyme there is added 0.9 g. sodium hydride and after one hour of stirring 3.6 g. of 2-chloroethyl isothiocyanate in 10 ml. of dry glyme. The mixture is refluxed for 1.5 hour. The solvent is evaporated under vacuum and water is added to the residue. The resulting solid is filtered off and crystallized from glyme to yield 1.9 g., m.p. 249°–252°.

EXAMPLE 4

2-Amino-5(and 6)-methyl-1-(2-thiazolin-2-yl)benzimidazole

Following the procedure of Example 3 and replacing 2-amino-5,6-dichlorobenzimidazole with 2-amino-5-methylbenzimidazole the title compound is obtained, m.p. 210°–223°.

EXAMPLE 5

2-Amino-5(and 6)-chloro-1-(2-thiazolin-2-yl)-benzimidazole

Following the procedure of Example 3 and replacing 2-amino-5,6-dichlorobenzimidazole with 2-amino-5-chlorobenzimidazole the title compound is obtained, m.p. 205°–226°.

EXAMPLE 6

2-Amino-5(and 6)-nitro-1-(2-thiazolin-2-yl)benzimidazole

Following the procedure of Example 3 and replacing 2-amino-5,6-dichlorobenzimidazole with 2-amino-5-nitrobenzimidazole the title compound is obtained, m.p. 228°–238°.

EXAMPLE 7

2-Amino-1-(2-thiazolin-5-methyl-2-yl)benzimidazole

To a suspension of 2 g. of 2-(o-aminoanilino)-5-methyl-2-thiazoline in 10 ml. of water there is added in protions 2.2 g. of cyanogen bromide. The solid changes slowly into an oil. After 15 minutes there is added sodium bicarbonate solution and the resulting solid is filtered off, crystallized from glyme-petroleum ether to yield 0.9 g. m.p. 153°–155°.

EXAMPLE 8

2-(2'-Thenylideneamino)benzimidazole

A mixture of 3.99 g 2-aminobenzimidazole, 3.36 g. of 2-thiophenecarboxaldehyde is refluxed for 15 minutes. On cooling, a solid separates which is filtered off and crystallized from methanol to yield 4.1 g. Two crystallizations from ethyl ether furnish an analytically pure sample, m.p. 225°–227°.

EXAMPLE 9

1(2'-Thiazolin-2-yl)-2-(2'-thenylideneamino)benzimidazole

A mixture of 0.436 g. of 2-amino-1-(2-thiazolin-2-yl)-benzimidazole and 2 ml. of 2-thiophenecarboxaldehyde is refluxed for five minutes. On cooling, a solid separates which is filtered off to yield 0.4 g. Crystallization from ethyl ether yields the pure compound, m.p. 165°–167°.

EXAMPLE 10

2-(Furfurylideneamino)-5-nitrobenzimidazole 1.8 g. of 2-Amino-5-nitrobenzimidazole is refluxed in 10 ml. of furfural for 10 minutes. The mixture is cooled and methanol is added. The resulting solid is filtered off and crystallized from glyme to yield 1.5 g., m.p. 239°–240°.

EXAMPLE 11

2-(Furfurylideneamino)benzimidazole 1.33 g. of 2-Aminobenzimidazole is refluxed in 7 ml. of furfural for 30 minutes. The mixture is cooled and washed with excess water. The resulting dark solid is filtered off and crystallized four times from acetone to yield 0.5 g. of yellow solid, m.p. 205°–207°.

EXAMPLES 12–16

2-(Heterocyclicmethylideneamino)benzimidazole

According to the procedure of Example 8, upon substituting, in place of the thiophenecarboxaldehyde, the following compounds:
pyridine-2-carboxaldehyde,
N-methylpyrrole-2-carboxaldehyde,
imidazole-2-carboxaldehyde,
thiazole-2-carboxaldehyde and
indole-5-carboxaldehyde one obtains:
2-(2'-pyridinylmethylideniamino)benzimidazole
2-(2'-N-methylpyrrolemethylideneamino)benzimidazole
2-(2'-imidazolylmethylideneamino)benzimidazole
2-(2'-thiazolylmethylideneamino)benzimidazole
2-(5'-indolylmethylideneamino)benzimidazole respectively.

EXAMPLES 17–23

Substituted 2-(2'-Thenylideneamino)benzimidazoles

According to the procedure of Example 8, upon substituting in place of the 2-aminobenzimidazole the following compounds:
2-amino-1-methylbenzidazole,
2-amino-1-benzyl-5-nitrobenzimidazole,
2-amino-1-iso-butyl-6-methoxybenzimidazole,
2-amino-5-methylbenzimidazole,
2-amino-5-chlorobenzimidazole,
2-amino-4-ethoxybenzimidazole and
2-amino-6-benzylbenzimidazole one obtains:
2-(2'-thenylideneamino)-1-methylbenzimidazole,
2-(2'-thenylideneamino)-1-benzyl-5-nitrobenzimidazole,
2-(2'-thenylideneamino)-1-isobutyl-6-methoxybenzimidazole,
2-(2'-thenylideneamino)-5-methylbenzimidazole,
2-(2'-thenylideneamino)-5-chlorobenzimidazole,
2-(2'-thenylideneamino)-4-ethoxybenzimidazole and
2-(2'-thenylideneamino)-6-benzylbenzimidazole respectively.

EXAMPLES 24–26

2-(Heterocyclicmethylideneamino)benzimidazoles

According to the procedure of Example 9, upon substituting in place of the 2-thiophenecarboxaldehyde, the following compounds:
2-(2'-thiophene)acrolein,
pyridine-4-carboxaldehyde and
4-methylthiophene-2-carboxaldehyde, one obtains:
1-(2'-thiazolin-2-yl)-2-(3'-thien-2-ylpropenylideneamino)benzimidazole,
1-(2'-thiazolin-2-yl)-2-(4'-pyridinylmethylideneamino)benzimidazole and
1-(2'-thiazolin-2-yl)-2-(4-methylthien-2-ylmethylideneamino)benzimidazole, respectively.

EXAMPLES 27–29

2-(Heterocyclicmethylideneamino)benzimidazoles

According to the procedure of Example 11, upon substituting in place of the furfural, the following compounds:
2-fur-2'-ylpropenal,
5-methylfurfural and
benzofuran-3-carboxaldehyde, one obtains:
2-(3'-fur-2-ylpropenylideneamino)benzimidazole
2-(5'-methylfurfurylideneamino)benzimidazole and
2-(3'-benzofuranmethylideneamino)benzimidazole, respectively.

EXAMPLES 30–35

Substituted 2-(furfurylideneamino)benzimidazoles

According to the procedure of Example 11, upon substituting in place of the 2-aminobenzimidazole, the following compounds:
2-amino-5-acetylbenzimidazole,
2-amino-6-phenyl-1-ethylbenzimidazole,
2-amino-5-phenyl-1-benzylbenzimidazole,
2-amino-5-bromobenzimidazole
2-amino-7-isopropoxybenzimidazole and
2-amino-1-(5,6-dihydro-4H-1,3-thiazin-2-yl)benzimidazole, one obtains:
2-(furfurylideneamino)-5-acetylbenzimidazole,
2-(furfurylideneamino)-6-phenyl-1-ethylbenzimidazole,
2-(furfurylideneamino)-5-phenyl-1-benzylbenzimidazole,
2-(furfurylideneamino)-5-bromobenzimidazole,
2-(furfurylideneamino)-7-isopropoxybenzimidazole and
2-(furfurylideneamino)-1-(5,6-dihydro-4H-1,3-thiazin-2-yl)benzimidazole, respectively.

EXAMPLE 36

Preparation of capsule formulation

| Ingredient | Milligrams per Capsule |
|---|---|
| 2-(2'-Thenylideneamino)benzimidazole | 400 |
| Starch | 80 |
| Magnesium stearate | 5 |

The active ingredient, starch and magnesium stearate are blended together. The mixture is used to fill hard shell capsules of a suitable size at a fill weight of 485 milligrams per capsule.

EXAMPLE 37

Preparation of tablet formulation

| Ingredient | Milligrams per Tablet |
|---|---|
| 2-(2'-Thiazolin-2-yl)-2-(2'-thenylideneamino)benzimidazole | 300 |
| Lactose | 200 |
| Corn starch (for mix) | 50 |
| Corn starch (for paste) | 50 |
| Magnesium stearate | 6 |

The active ingredient, lactose and corn starch (for mix) are blended together. The corn starch (for paste) is suspended in water at a ratio of 10 grams of corn starch per 80 milliliters of water and heated with stirring to form a paste. This paste is then used to granulate the mixed powders. The wet granules are passed through a No. 8 screen and dried at 120°F. The dry granules are passed through a No. 16 screen. The mixture is lubricated with magnesium stearate and compressed into tablets in a suitable tableting machine. Each tablet contains 300 milligrams of active ingredient.

EXAMPLE 38

Preparation of oral syrup formulation

| Ingredient | Amount |
| --- | --- |
| 2-(furfurylideneamino)-5-nitrobenzimidazole | 5000 mg. |
| Sorbitol solution (70% N.F.) | 40 ml. |
| Sodium benzoate | 150 mg. |
| Sucaryl | 90 mg. |
| Saccharin | 10 mg. |
| Red Dye (F.D. & C. No. 2) | 10 mg. |
| Cherry flavor | 50 mg. |
| Distilled water qs to | 100 ml. |

The sorbitol solution is added to 40 milliliters of distilled water and the active ingredient is suspended therein. The sucaryl, saccharin, sodium benzoate, flavor and dye are added and dissolved in the above solution. The volume is adjusted to 100 milliliters with distilled water.

Other ingredients may replace those listed in the above formulation. For example, a suspending agent such as bentonite, magma, tragacanth, carboxymethylcellulose, or methylcellulose may be used. Phosphates, citrates or tartrates may be added as buffers. Preservatives may include the parabens, sorbic acid and the like and other flavors and dyes may be used in place of those listed above.

EXAMPLE 39

Preparation of a cream formulation

| Ingredients | Percent |
| --- | --- |
| 2-(furfurylideneamino)-5-nitrobenzimidazole, micropulverized | 0.1–1.0 |
| Propylene glycol | 5–50 |
| Cream base* sufficient to make | 100 |
| *Cream Base | Percent |
| Glyceryl monostearate NF XII | 9.4 |
| Cetyl alcohol | 2.2 |
| Myristyl stearate | 5.6 |
| Isopropyl palmitate | 2.2 |
| Tween 60 | 3.3 |
| Propylene glycol | 15 |
| Aqueous buffer (pH 4–6) qs to | 100 |

PROCEDURE

The glyceryl monostearate, cetyl alcohol, myristyl stearate and about one-third Tween 60 is melted at 80°–90°C, in a suitable jacketed stainless steel or glass-lined kettle. In a similar container the water, (buffer) remainder of Tween and 15 percent of the propylene glycol is heated to 80°–90°C. The oil phase is added to the aqueous phase at approximately the same temperature with slow agitation. In an optimized vehicle, the active ingredient is in solution, at about saturation. The quantity of propylene glycol is dependent upon the concentration of the active compound (i.e., 1.0 percent, 0.15 percent, 0.11 percent). Care should be exercised in heating the active solution to guard against degradation.

EXAMPLE 40

Preparation of a Lotion

| Ingredients | Percent |
| --- | --- |
| 2-(furfurylideneamino)benzimidazole micropulverized | 0.1–1.0 |
| Propylene glycol | 5.0 |
| Lotion base* sufficient to make | 100.0 |
| *Lotion Base | Per 100.0 Gm. |
| Cetyl alcohol | 3.16 Gm |
| Stearyl alcohol | 0.211 Gm |
| Span 40 | 0.526 Gm |
| Propylene glycol | 4.74 Gm |
| Tween 20 | 2.32 Gm |
| Antifoam AF Emulsion | 0.0105 Gm |
| Methyl Paraben | 0.211 Gm |
| Propyl Paraben | 0.0211 Gm |
| Purified Water sufficient to make | 100.00 Gm |

PROCEDURE

To a suitable jacketed stainless steel or glass-lined kettle equipped with an agitator, the parabens, antifoam AF emulsion, propylene glycol, and the Tween 20 are added and dissolved in the required quantity of purified water heated to approximately 80°C. In a similar kettle equipped with an agitator, the cetyl alcohol, stearyl alcohol, and span 40 are melted together at a temperature of approximately 80°C, and are mixed until homogeneous. The oil phase is added to the aqueous phase at a temperature of approximately 80°C, with agitation. When uniformly mixed, the material is transferred to a Gate-type jacketed mixer and cooled under slow agitation to approximate ambient room temperature. In a suitable stainless steel mixing bowl, the propylene glycol is added to the steroid and mixed until uniform. The mixture is transferred to a suitable planetary-type mixing kettle, then the required quantity of lotion base is added and followed by mixing until the preparation is uniform.

What is claimed is:

1. A compound of the formula

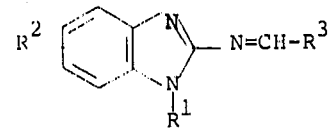

wherein $R^1$ is thiazoline or 5,6-dihydro-4H-1,3-thiazine; $R^2$ is hydrogen, nitro, or chloro; and $R^3$ is thienyl or furyl; and the pharmaceutically acceptable salts thereof.

2. The compound of the claim 1 wherein $R^3$ is thienyl.

3. The compound of claim 2 having the name 1-(2'-thiazolin-2-yl)-2-(2'-thenylideneamino)benzimidazole.

4. The compound of claim 1 wherein $R^3$ is furyl.

5. The compound of claim 4 having the name 2-(furfurylideneamino)-1-(5,6-dihydro-4H-1,3-thiazin-2-yl)benzimidazole.

6. A compound of the formula:

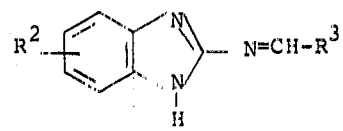

wherein R² is hydrogen, nitro or chloro, and R³ is thienyl, and the pharmaceutically acceptable salts thereof.

7. The compound of claim 6 having the name 2-(2'-thenylideneamino)benzimidazole.

8. The compound of claim 6 having the name 2-(2'-thenylideneamino)-5-chlorobenzimidazole.

9. A compound of the formula:

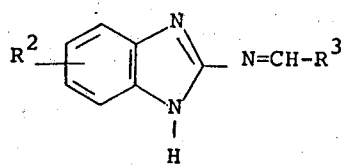

wherein R² is nitro or chloro; and R³ is furyl; and the pharmaceutically acceptable salts.

10. The compound of claim 9 having the name 2-(furfurylideneamino)-5-nitrobenzimidazole.

* * * * *

UNITED STATES PATENT AND TRADEMARK OFFICE
CERTIFICATE OF CORRECTION

PATENT NO. : 3,926,967
DATED : December 16, 1975
INVENTOR(S) : Haugwitz et al.

It is certified that error appears in the above—identified patent and that said Letters Patent are hereby corrected as shown below:

The structure in claim 1 should read as follows:

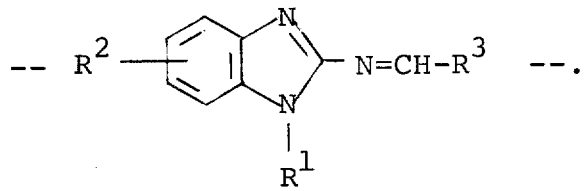

Signed and Sealed this eighteenth Day of May 1976

[SEAL]

Attest:

RUTH C. MASON
Attesting Officer

C. MARSHALL DANN
Commissioner of Patents and Trademarks